(12) United States Patent
Descoteaux

(10) Patent No.: US 10,899,284 B2
(45) Date of Patent: Jan. 26, 2021

(54) VEHICLE MOUNTED FOLDABLE CARRYING SYSTEM

(71) Applicant: Timothy J Descoteaux, Morris, CT (US)

(72) Inventor: Timothy J Descoteaux, Morris, CT (US)

( * ) Notice: Subject to any disclaimer, the term of this patent is extended or adjusted under 35 U.S.C. 154(b) by 0 days.

(21) Appl. No.: 16/516,440

(22) Filed: Jul. 19, 2019

(65) Prior Publication Data

US 2020/0023785 A1    Jan. 23, 2020

Related U.S. Application Data

(60) Provisional application No. 62/700,491, filed on Jul. 19, 2018.

(51) Int. Cl.
*B60R 9/06* (2006.01)
*B62D 33/023* (2006.01)
*B60R 11/00* (2006.01)

(52) U.S. Cl.
CPC ............ *B60R 9/065* (2013.01); *B62D 33/023* (2013.01); *B60R 2011/004* (2013.01); *B60R 2011/0085* (2013.01)

(58) Field of Classification Search
CPC ... B60R 9/06; B60R 9/065; B60R 2011/0082; B60R 2011/0085
See application file for complete search history.

(56) References Cited

U.S. PATENT DOCUMENTS

| | | | | |
|---|---|---|---|---|
| 1,808,042 A | * | 6/1931 | Kennedy | B60R 9/06 224/499 |
| 2,100,261 A | * | 11/1937 | Montgomery | B60R 7/043 224/275 |
| 2,594,319 A | * | 4/1952 | Law | B60R 9/06 224/42.32 |
| 2,646,910 A | * | 7/1953 | Wiershing | B62D 49/02 224/504 |
| 3,913,811 A | * | 10/1975 | Spencer | B60R 9/06 224/508 |
| 4,383,629 A | * | 5/1983 | Kerkow | B60R 9/06 224/329 |
| 4,406,384 A | * | 9/1983 | Schantz | B60R 9/06 224/329 |
| 5,219,106 A | * | 6/1993 | Glunt | B60R 9/06 224/317 |
| 5,368,210 A | * | 11/1994 | Wotring | B60P 7/08 224/318 |
| 5,628,442 A | * | 5/1997 | Wayne | B60R 7/005 224/42.33 |

(Continued)

FOREIGN PATENT DOCUMENTS

GB       2554664 A * 4/2018 ............... B60R 9/06

*Primary Examiner* — Justin M Larson
(74) *Attorney, Agent, or Firm* — Carla Gannon Law

(57) ABSTRACT

A carrying system is releasably attached to a vehicle such as a tractor, zero turn mower, ATV or UTV, and includes a flexible storage basket and optional accessories for retaining a variety of items including tools and materials. The flexible storage basket pivots downwardly for use, and upwardly for storage. The carrying system includes a column that releasably engages with a hitch assembly of a vehicle, thereby allowing the carrying system to be put onto and taken off of a vehicle fairly quickly and easily.

18 Claims, 14 Drawing Sheets

(56) References Cited

U.S. PATENT DOCUMENTS

| | | | | |
|---|---|---|---|---|
| 5,938,395 | A * | 8/1999 | Dumont, Jr. | B60R 9/06 224/497 |
| 6,276,698 | B1 * | 8/2001 | Calandra | B62B 15/00 280/18 |
| 6,382,486 | B1 * | 5/2002 | Kretchman | B60R 9/06 224/498 |
| 6,439,444 | B1 * | 8/2002 | Shields, II | B60R 9/06 224/280 |
| 7,028,872 | B2 * | 4/2006 | Lobanoff | B60R 5/047 211/123 |
| 7,318,617 | B1 * | 1/2008 | Scotton | B60R 5/045 224/484 |
| 7,325,356 | B2 * | 2/2008 | Norman | A01K 77/00 43/11 |
| 7,350,681 | B2 * | 4/2008 | Polburn | B60R 7/005 224/275 |
| 7,708,329 | B2 * | 5/2010 | Duller | B60R 7/005 296/37.5 |
| 7,886,948 | B2 * | 2/2011 | Kerr | B60R 9/06 224/519 |
| 8,474,561 | B2 * | 7/2013 | Allingham | B62K 5/01 180/89.11 |
| D720,281 | S * | 12/2014 | Grant | D12/414.1 |
| 8,998,285 | B2 * | 4/2015 | Bethel, Jr. | B60R 9/06 296/38 |
| 9,533,623 | B2 * | 1/2017 | Descoteaux | B62B 3/02 |
| 9,586,637 | B2 * | 3/2017 | Kentner | B60R 9/065 |
| D790,433 | S * | 6/2017 | Descoteaux | D12/406 |
| D856,900 | S * | 8/2019 | Baumann | D12/406 |
| 10,384,617 | B1 * | 8/2019 | Keyser | B60R 9/06 |
| 10,426,081 | B2 * | 10/2019 | Biers, Sr. | B60R 21/13 |
| D868,843 | S * | 12/2019 | Descoteaux | D15/17 |
| 10,569,715 | B2 * | 2/2020 | Clark | B60R 9/06 |
| 10,737,626 | B2 * | 8/2020 | Ni | B60R 5/003 |
| 2005/0092800 | A1 * | 5/2005 | Wilson | B60R 9/08 224/513 |
| 2005/0116002 | A1 * | 6/2005 | Ferman | B60R 9/06 224/497 |
| 2005/0199671 | A1 * | 9/2005 | Riley | B60R 9/06 224/512 |
| 2005/0274759 | A1 * | 12/2005 | Kircher | B60R 9/06 224/499 |
| 2006/0097482 | A1 * | 5/2006 | Cumbie | B60R 9/06 280/491.3 |
| 2006/0104767 | A1 * | 5/2006 | Dugger | B60R 9/06 414/462 |
| 2008/0041904 | A1 * | 2/2008 | Price | B60R 9/06 224/519 |
| 2009/0205847 | A1 * | 8/2009 | Benoit | B60R 9/06 172/249 |
| 2009/0277856 | A1 * | 11/2009 | Lin | B60R 9/06 211/195 |
| 2010/0044999 | A1 * | 2/2010 | Columbia | A01K 97/10 280/511 |
| 2010/0096347 | A1 * | 4/2010 | Theobald | B60R 9/10 211/85.7 |
| 2010/0181357 | A1 * | 7/2010 | Christianson | B60R 11/00 224/497 |
| 2013/0239902 | A1 * | 9/2013 | Venne | A01K 1/0272 119/453 |
| 2018/0125008 | A1 * | 5/2018 | Borshov | A01B 59/006 |
| 2020/0023785 | A1 * | 1/2020 | Descoteaux | B60R 9/065 |
| 2020/0062162 | A1 * | 2/2020 | Owens | B60R 9/06 |
| 2020/0062193 | A1 * | 2/2020 | Jarvis | B60R 9/00 |
| 2020/0114980 | A1 * | 4/2020 | DeLong | B60R 9/06 |
| 2020/0122646 | A1 * | 4/2020 | Pellegrino | F16M 11/32 |
| 2020/0130600 | A1 * | 4/2020 | Morgan | B60R 9/06 |

* cited by examiner

VEHICLE MOUNTED FOLDABLE CARRYING SYSTEM

CROSS-REFERENCE TO RELATED APPLICATIONS

This application claims priority from the United States provisional patent application entitled VEHICLE MOUNTED FOLDABLE CARRYING SYSTEM, which was filed on Jul. 19, 2018, and assigned the Ser. No. 62/700,491.

BACKGROUND OF THE INVENTION

Field

The present invention relates to accessories for vehicles, and more specifically, to a carrying system with a flexible storage basket that is configured for connecting to, among other vehicles, tractors, zero turn mowers, ATV's and UTV's.

Related Art

Small tractors have become indispensable in many settings such as farms, large properties and industrial facilities because they are versatile, easy to use, and relatively inexpensive. One shortcoming of small tractors, however, is that they aren't configured to carry many tools or working implements. As a result the tractor user may have a difficult time transporting items to a desired location. Solutions such as trailers are useful, but tend to be expensive, require time and energy to attach, occupy a lot of storage space, make driving the tractor more difficult and more likely to jackknife when backing up, and items in a trailer are likely to bounce around and be damaged.

As can be seen, there is a need for a system for carrying items which is easy to use, doesn't take up much storage space, doesn't lessen the convenience or flexibility of using the tractor, doesn't unnecessarily jostle the items, and is inexpensive.

SUMMARY OF THE INVENTION

The present invention pertains to a carrying system releasably connected to a vehicle such as a tractor, mower or ATV. The carrying system includes a substantially upright frame and a basket assembly pivotally connected to the frame such that the basket assembly can be raised or lowered for storage or use, respectively. The frame preferably includes at least one accessory or tool holder for retaining tools outside the basket itself. The frame includes a column for engagement with a hitch assembly on the vehicle.

These and other aspects of the present invention will become apparent to those skilled in the art after a reading of the following description of the preferred embodiment when considered with the drawings.

DETAILED DESCRIPTION OF THE INVENTION

The following detailed description is of the best currently contemplated modes of carrying out exemplary embodiments of the invention. The description is not to be taken in a limiting sense, but rather it illustrates the general principles of the invention, with the scope of the invention set forth in the appended claims.

As used herein, the following structure numbers shall refer to the various structures of the invention as depicted in the figures:

10—Carrying system;
    20—Frame;
    21—Universal tool holder;
    22—Tool attaching accessory;
    23—Pivot clamp;
    24—Universal tool holder bracket;
    25—Universal tool holder strap;
    26—Lanyard;
    27—Basket support;
    28—Snap button;
    29—Rubber washer;
    30—Basket assembly;
    31—Front wall;
    32—Rear wall;
    33—Side wall;
    34—Bottom;
    35—Insert;
    37—Securing strap;
    38—Storage strap;
    40—Hitch assembly
    42—Hitch assembly mounting plate;
    44—Receiver;
    56—Column;
    57—Column connector plate;
    59—Auxiliary hitch bracket; and
    70—Tool trough.

Broadly, the present invention is a carrying system that attaches to a small vehicle such as a small tractor, mower, zero turn mower, ATV, or UTV. The carrying system preferably includes a flexible storage basket having four sides and a bottom, that can be put on and taken off a tractor fairly quickly and easily, and includes a plurality of components for holding tools and such. In use a user mounts the carrying system onto the tractor assembly of a tractor, lowers and secures the pivoting frame to position the basket assembly in the open position, uses the carrying system to transport items, and optionally removes carrying system afterwards.

Figure 1:
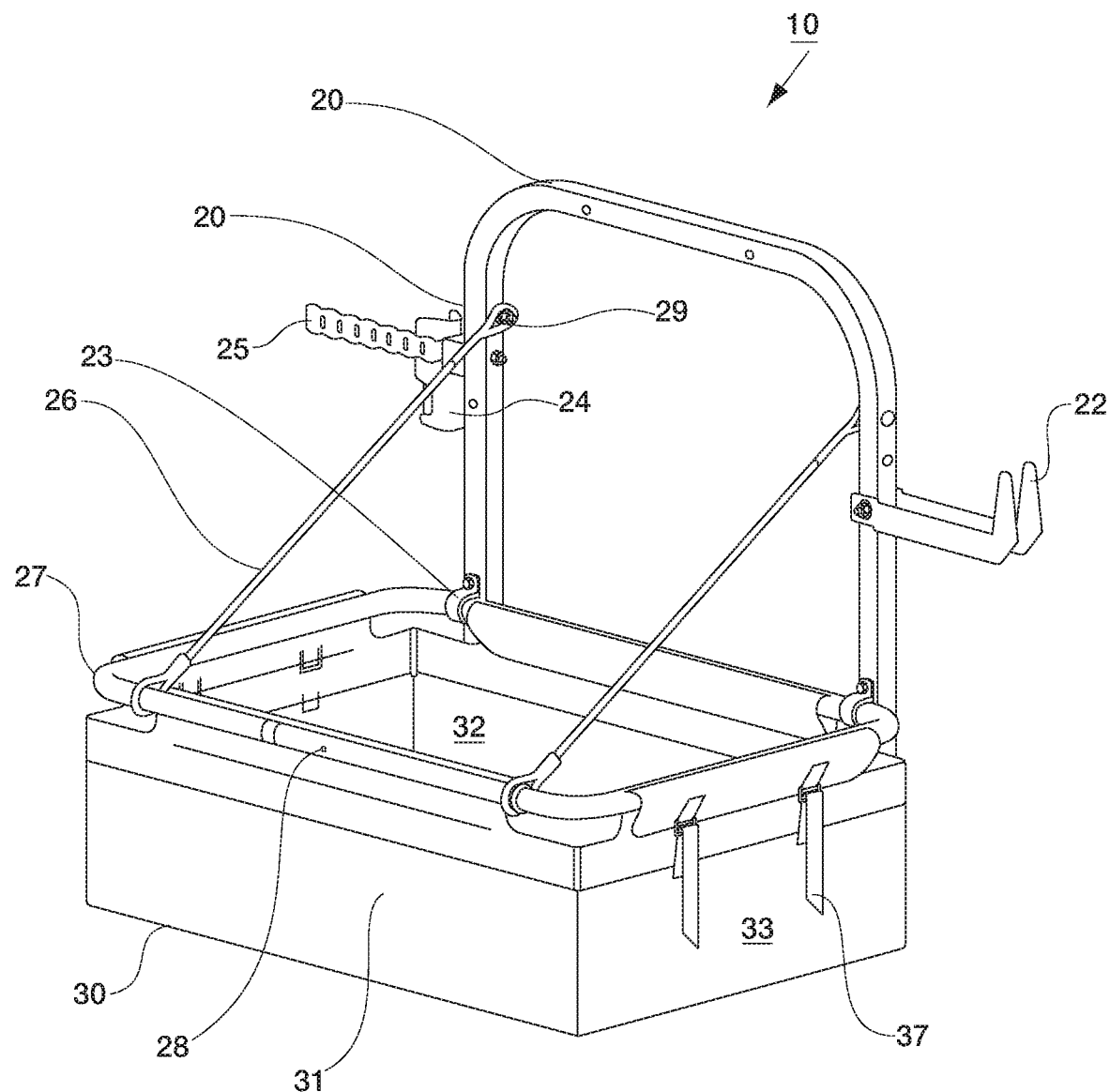
FIG. 1 is a perspective front view of a carrying system.
Figure 3:
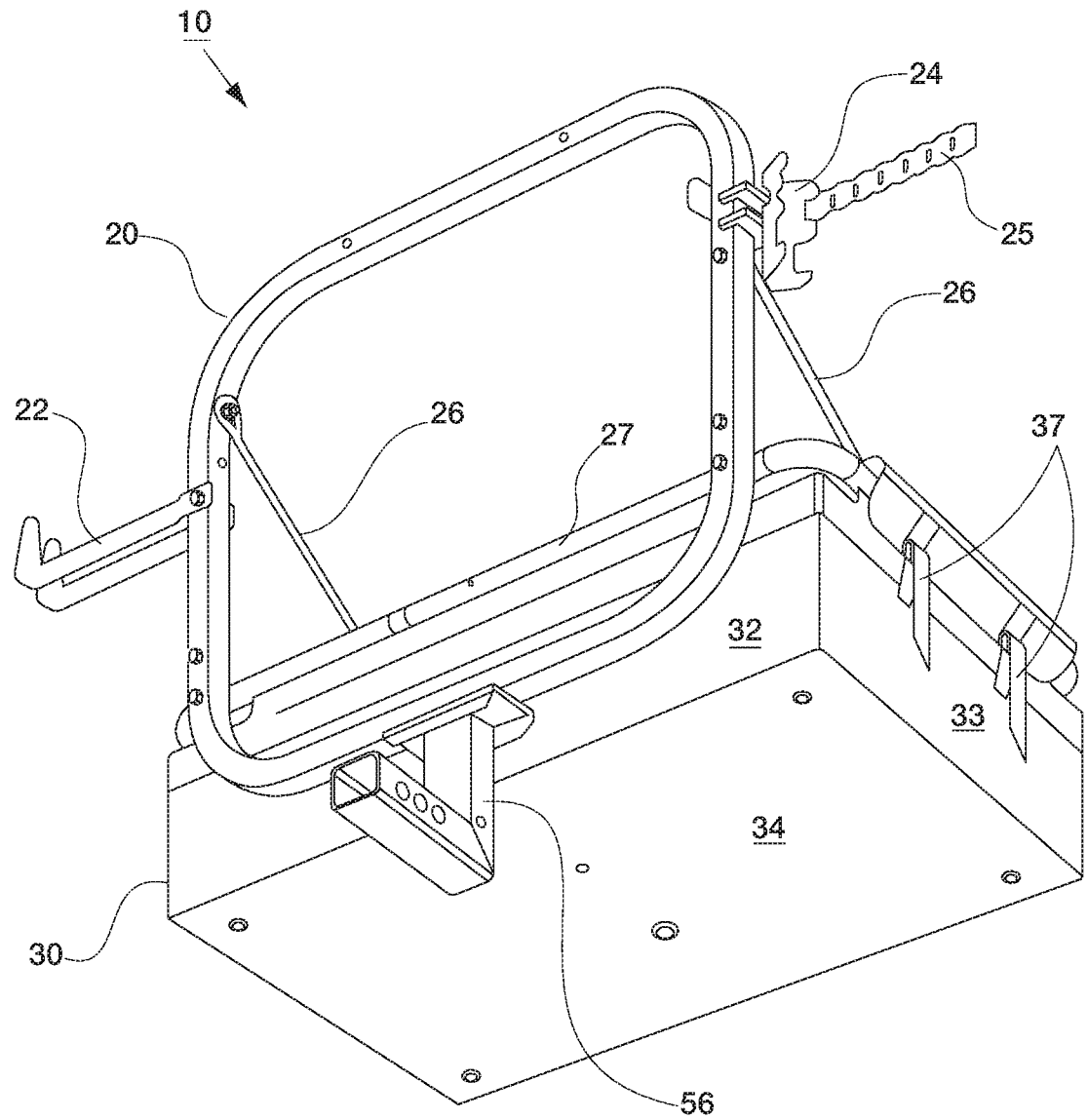
FIG. 3 is a perspective bottom view of a carrying system.
Figure 10:
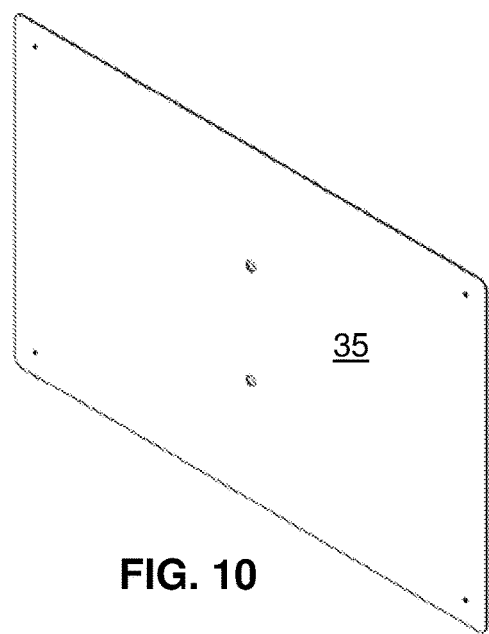
FIG. 10 is an insert.

As shown in FIG. 1, carrying system 10 generally includes vertically oriented frame 20 with basket assembly 30 pivotably engaged at pivot clamp 23. Basket assembly 30 includes front wall 31, rear wall 32, side walls 33 and bottom 34 (see FIG. 3) maintained by basket support 27. Insert 35 (see FIG. 10) is preferably sized and shaped to sit snugly atop bottom 34, thereby providing additional stability to the basket structure. In a preferred embodiment frame 20 is constructed of 1 inch round steel tube, and flexible portion of basket assembly 30 is constructed of approximately 20"×30" ballistic material.

Figure 2:
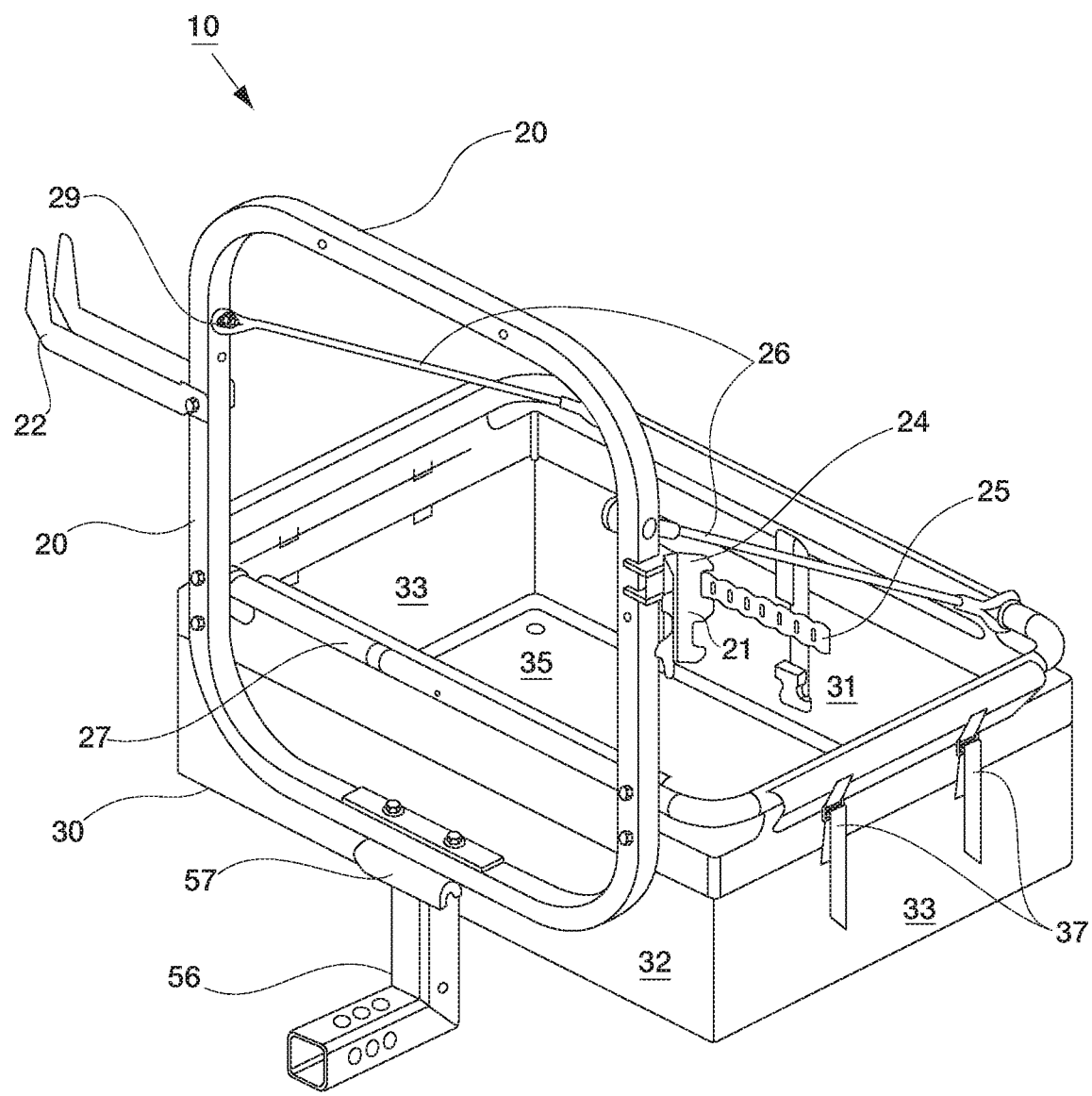
FIG. 2 is a perspective rear view of a carrying system.
Figure 19:
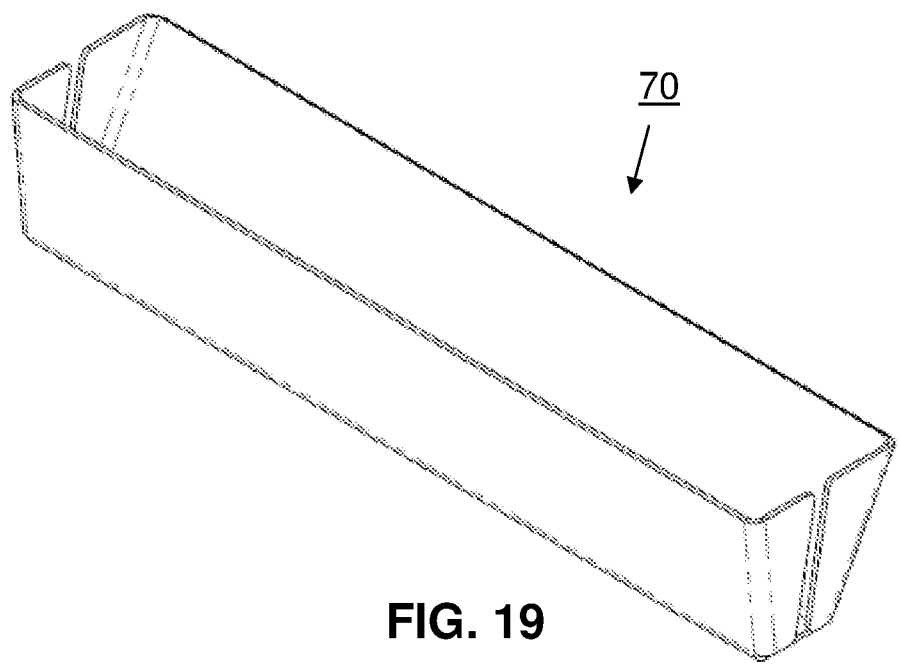
FIG. 19 is a tool trough accessory.
Figure 20:
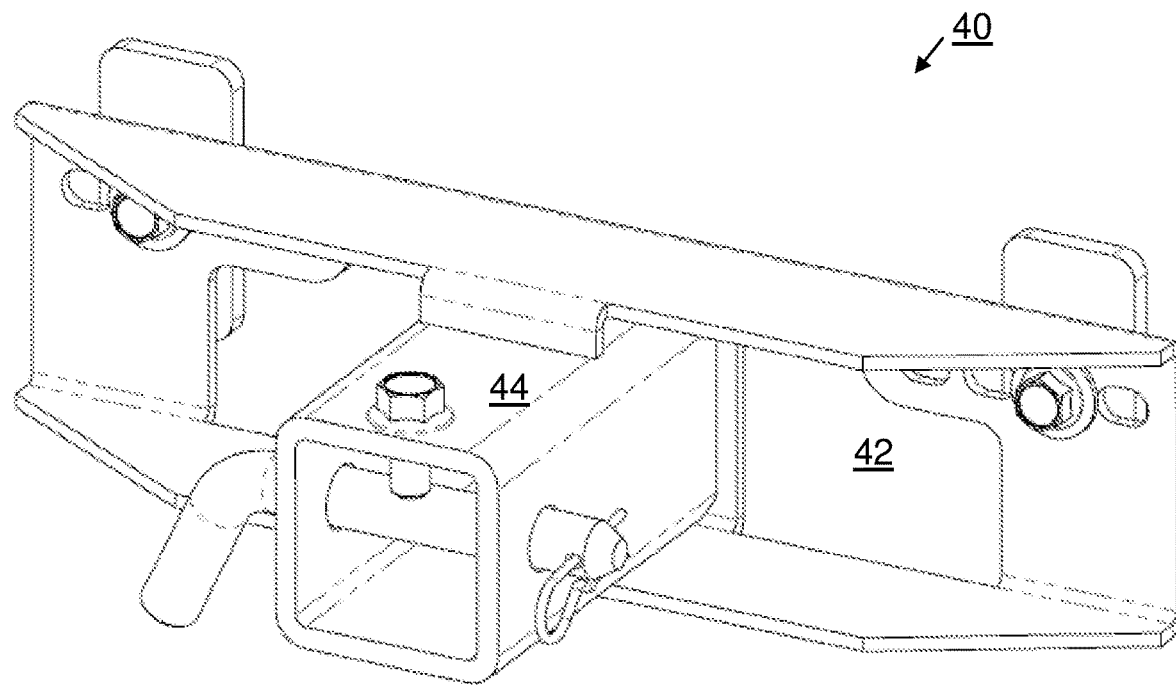
FIG. 20 is a perspective front view of a hitch assembly.
Figure 21:
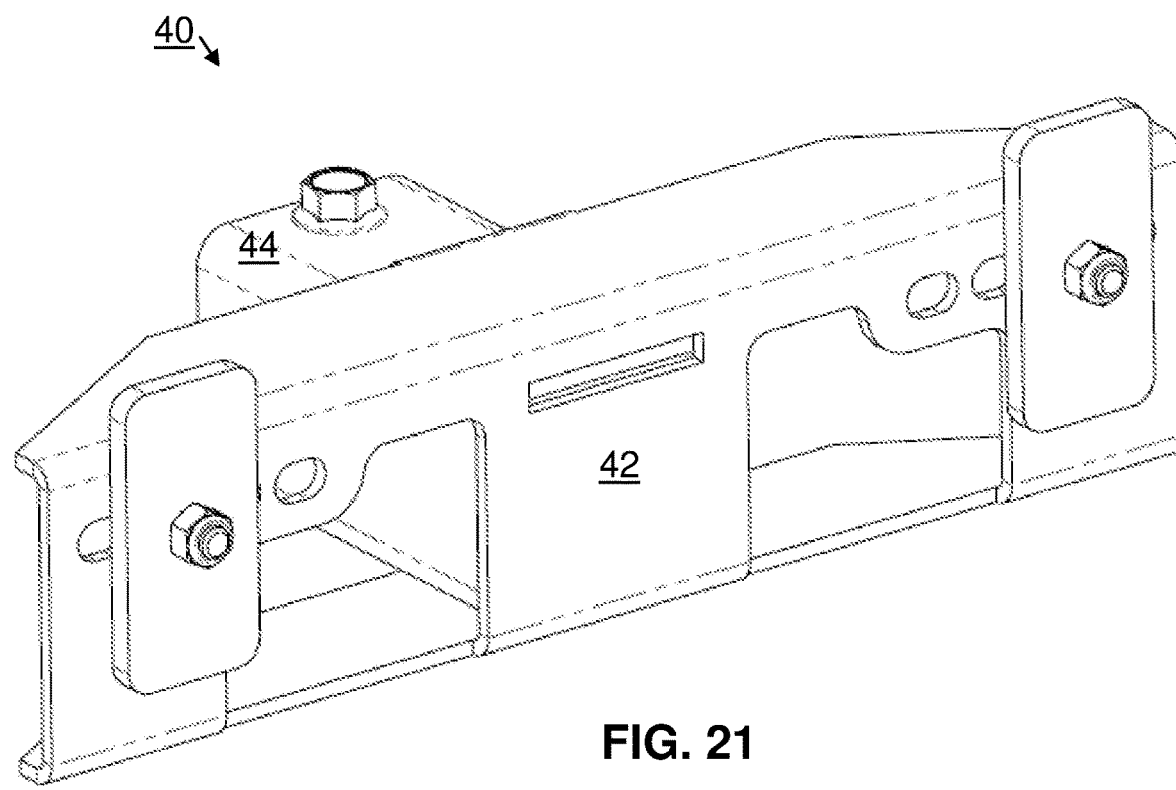
FIG. 21 is a perspective rear view of a hitch assembly.
Figure 22:
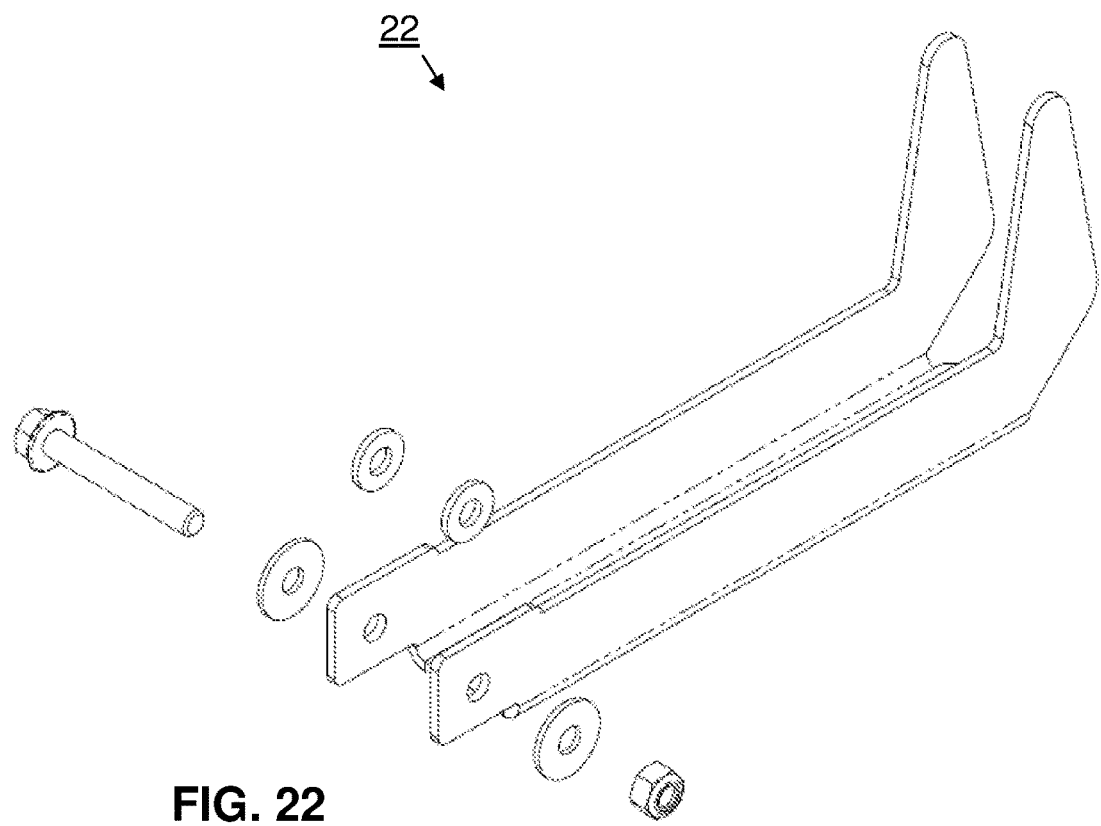
FIG. 22 is a tool attaching accessory.
Figure 23:
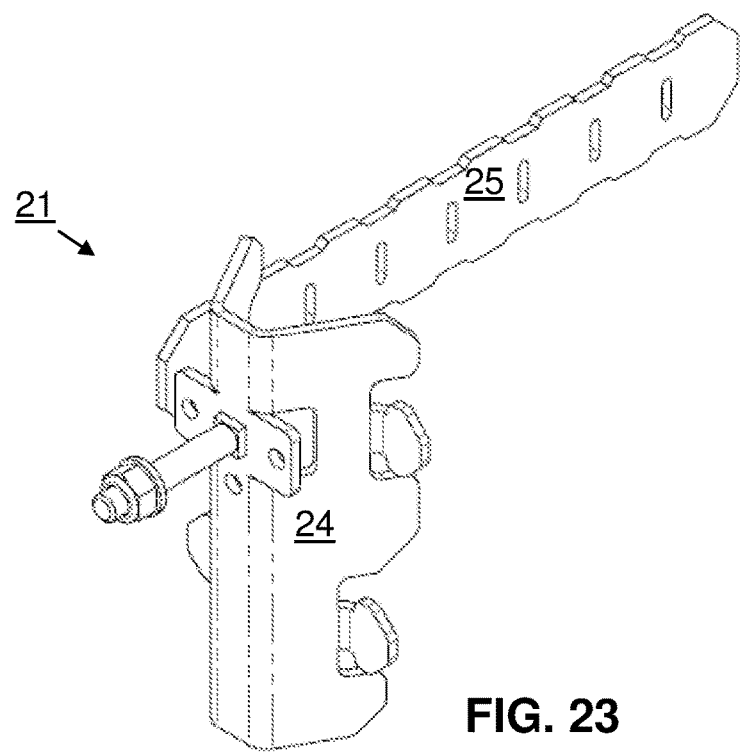
FIG. 23 is a universal tool holder, including universal tool holder bracket and universal tool holder strap.

Referring to FIG. 2, carrying system 10 preferably includes a variety of components such as universal tool holder 21 (shown best in FIG. 23), and tool attaching accessory 22 (shown best in FIG. 22), which are useful for securing a variety of implements including elongated tools such as rakes and shovels. FIG. 19 depicts tool trough 70, which can likewise be attached to frame 20 for carrying items.

Figure 11:
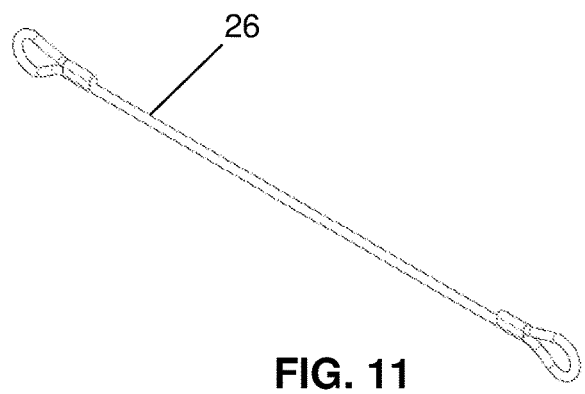
FIG. 11 is a lanyard.
Figure 16:
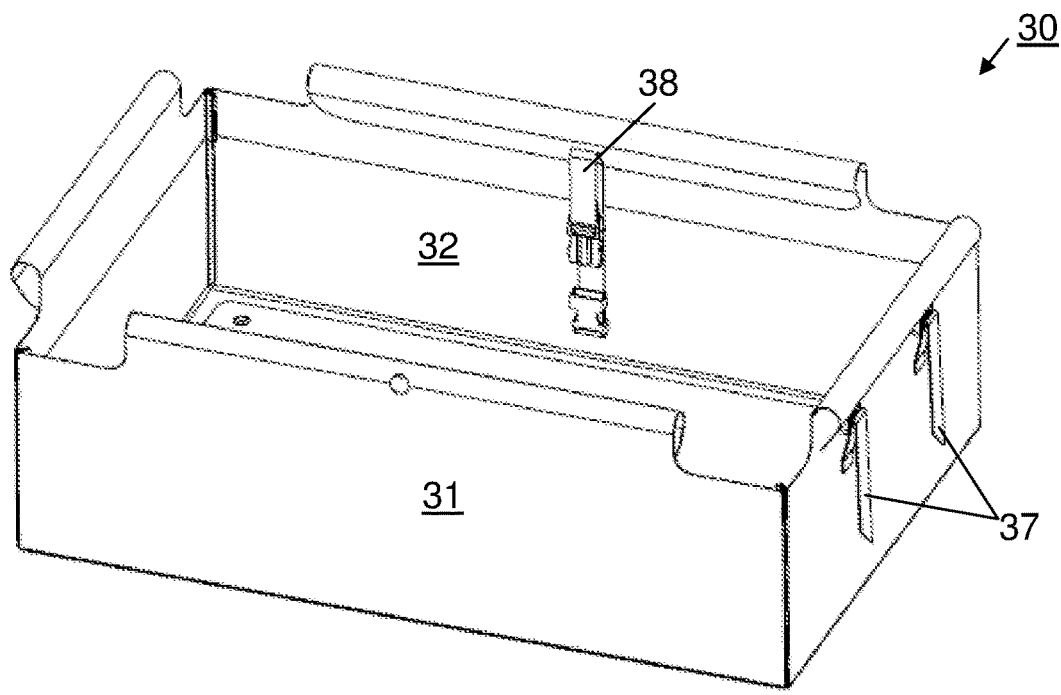
FIG. 16 is a top front perspective view of a basket assembly.
Figure 17:
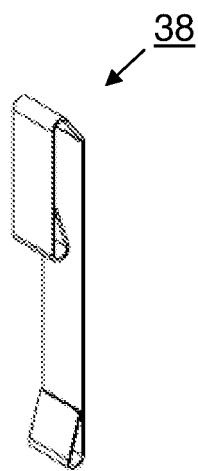
FIG. 17 is a storage strap.

Column 56 is connected to frame 20 with column connector plate 57. As shown best in FIG. 4, column 56 engages with hitch assembly 40. Although basket assembly 30 is shown in FIG. 2 in the downward position, it should be understood that basket support 27 pivots upwardly at pivot clamps 23 for storage. In this upward orientation basket support 27 would be substantially parallel with frame 20, and lanyards 26 would be slack. Basket support 27 may be retained in upward storage position with storage strap 38, shown in FIGS. 16 and 17. Lanyard 26 (FIG. 11) is preferably constructed of PVC coated steel cable and rubber washer 29 is preferably mounted to frame 20 to secure looped end of lanyard. In a preferred embodiment lanyards are approximately 19" to 21" long.

Closure devices 37 may be used to secure upper edges of front wall 31, rear wall 32 and or side walls 33 to bag support 27, but other securing devices such as tri-glide straps, buckles, buttons, clamps, ties, hook and loop fasteners and the like are also within the scope of this invention.

Figure 4:
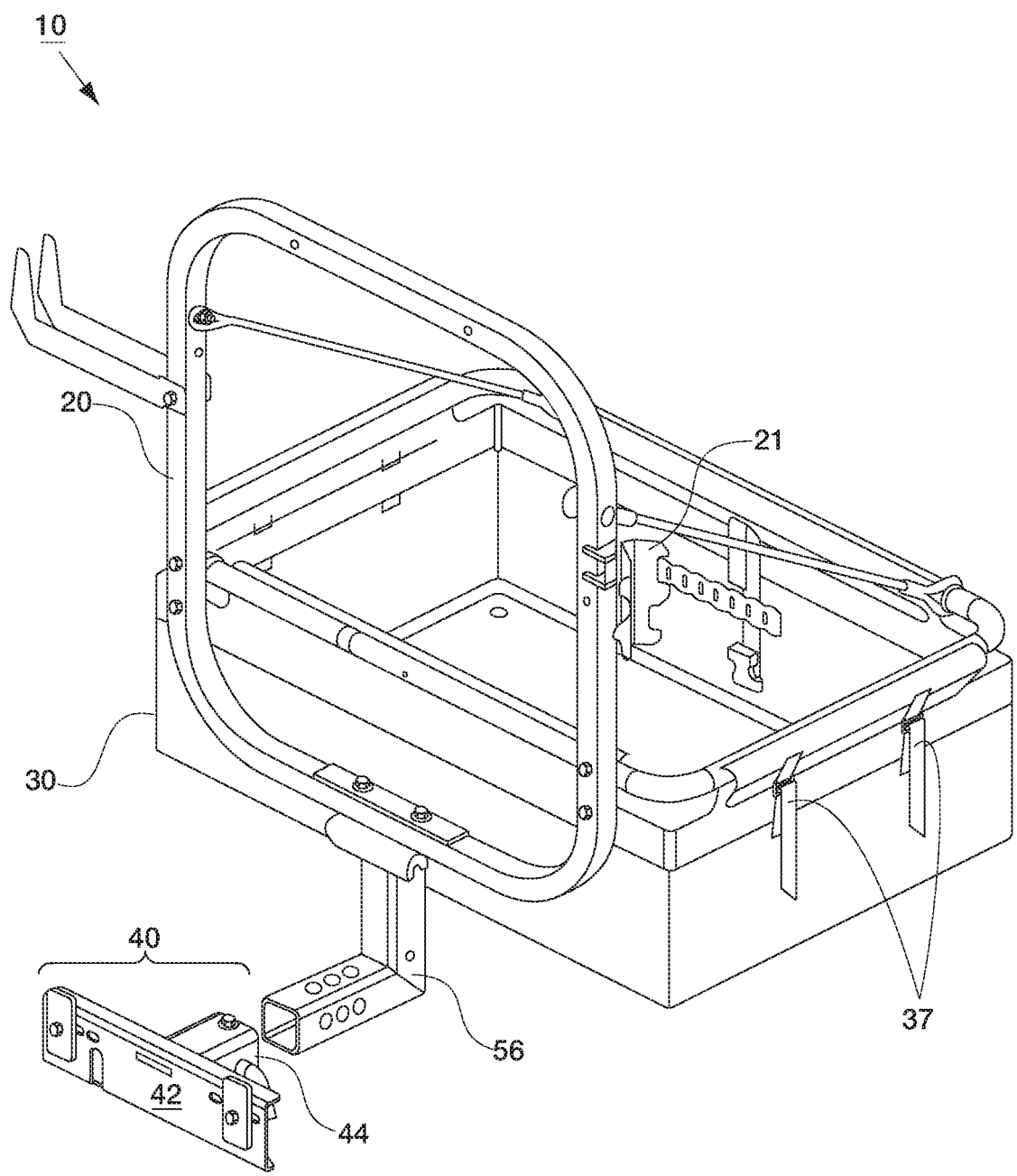
FIG. 4 is a perspective rear view of a carrying system and hitch assembly.
Figure 7:
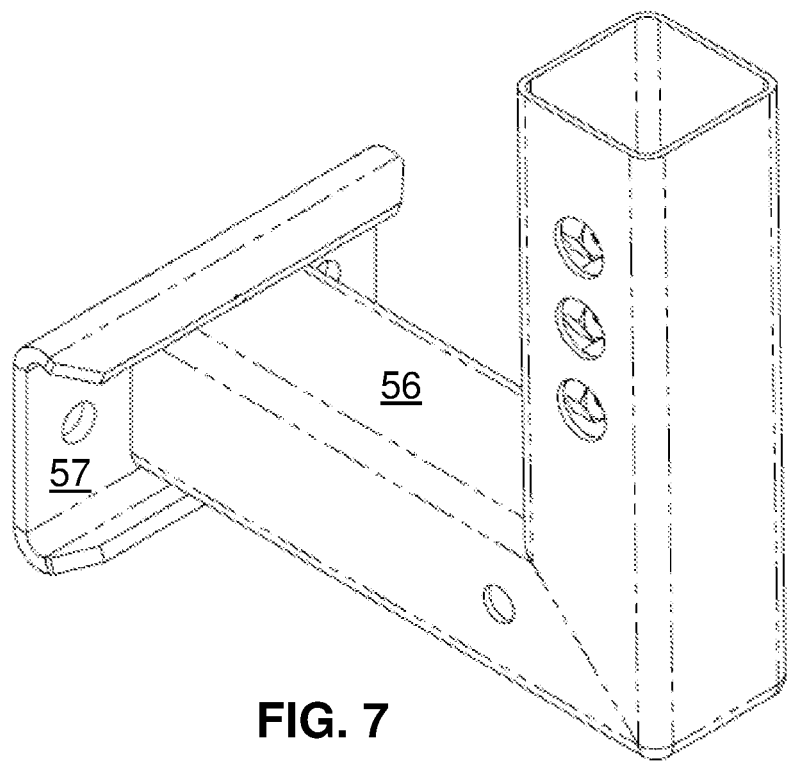
FIG. 7 is a column with a column connector plate attached.
Figure 12:
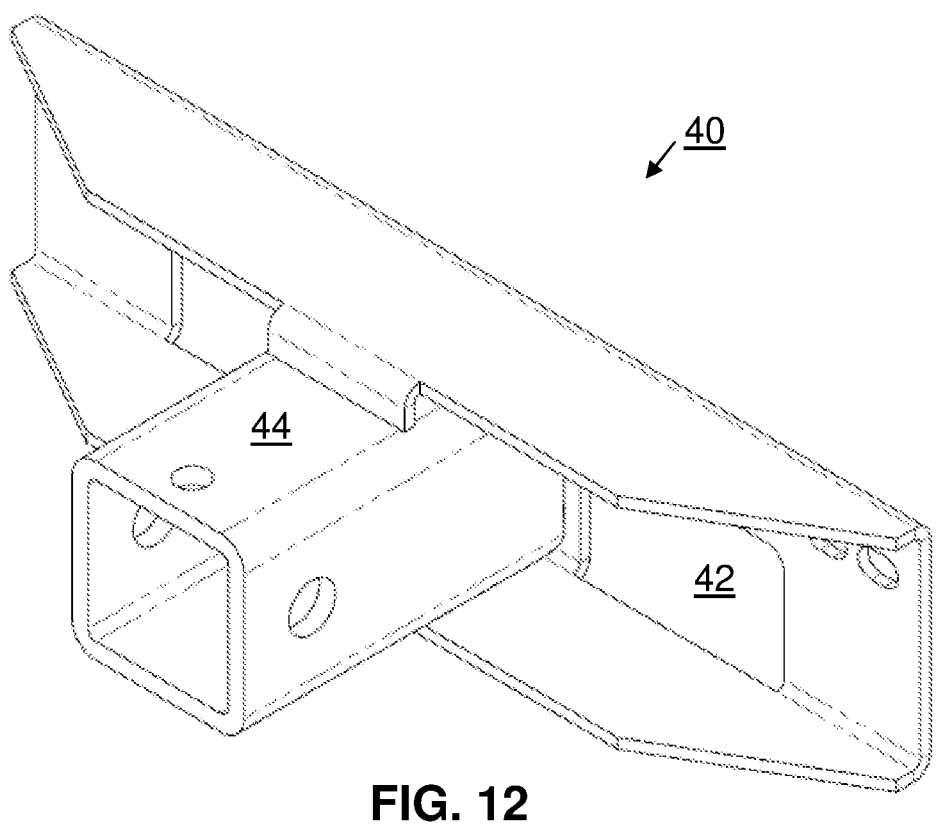
FIG. 12 is a hitch assembly.
Figure 13:
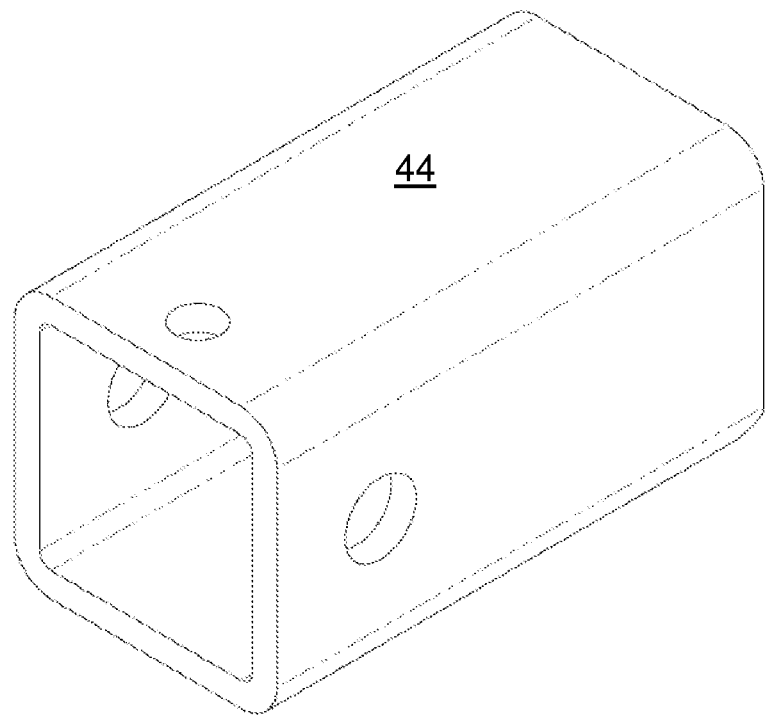
FIG. 13 is a receiver.
Figure 14:
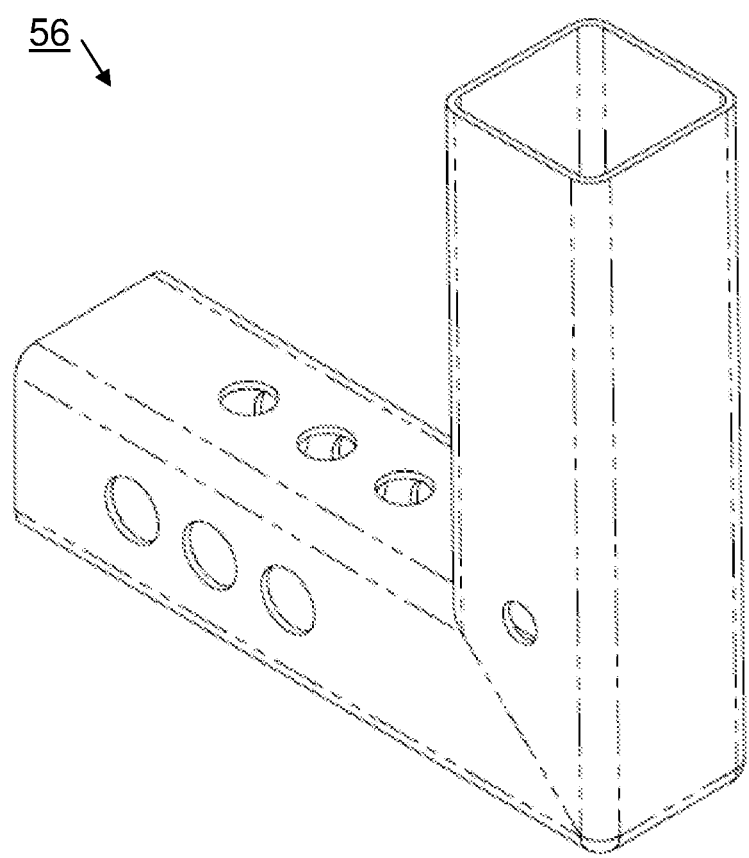
FIG. 14 is a column.
Figure 15:
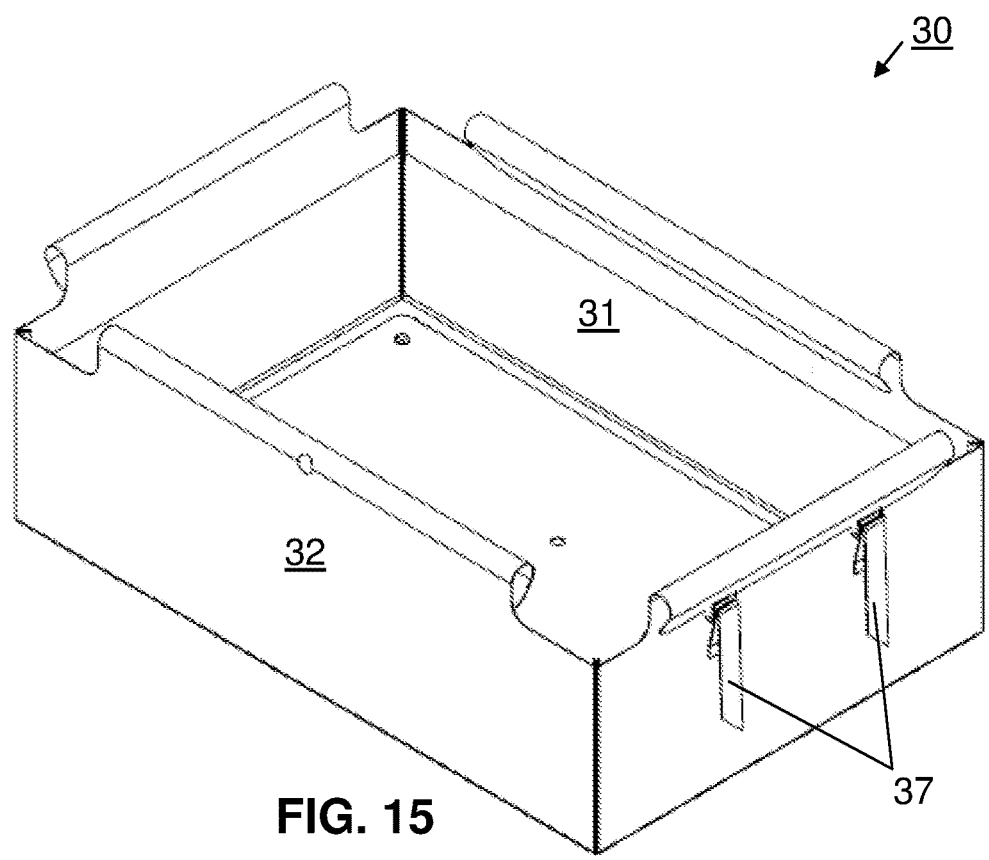
FIG. 15 is a top rear perspective view of a basket assembly.

Although not shown, hitch assembly 40 of FIG. 4 is releasably connected to the backside of a vehicle such as a tractor, mower or ATV at mounting plate 42. The preferred mounting plate 42 is depicted in FIG. 12. To engage carrying system 10, column 56 is inserted into receiver 44 and the connection is secured with bolts or the like, not shown. Column 56 and corresponding column connector plate 57 are shown best in FIGS. 14 and 7, respectively, while hitch assembly 40, hitch assembly mounting plate 42 and receiver 44 are best shown in FIGS. 12, 13, 20 and 21.

Figure 18:
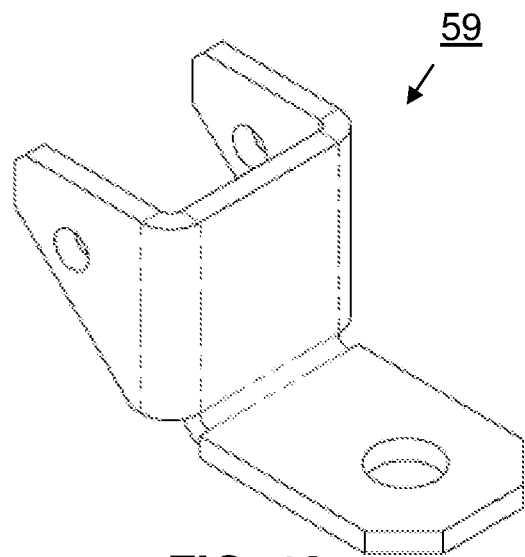
FIG. 18 is an auxiliary hitch bracket.
Figure 24:
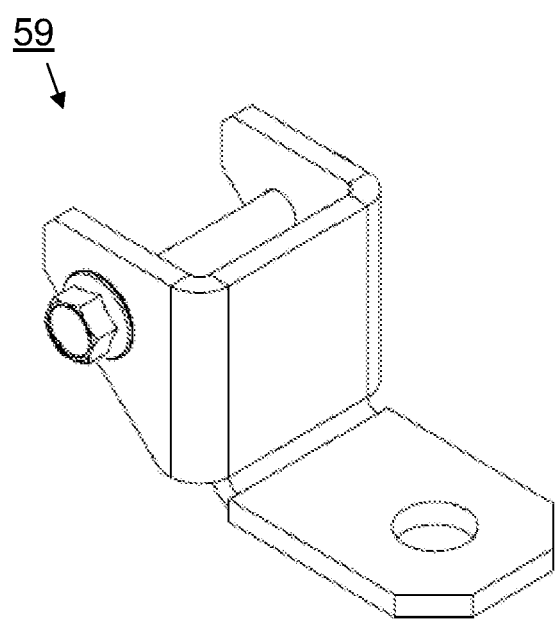
FIG. 24 is an auxiliary hitch bracket with securing bolt and nut.

Auxiliary hitch attachment 59, shown in FIGS. 18 and 24, may be integrated with outer vertex of column 56 for attaching additional items.

Figure 5:
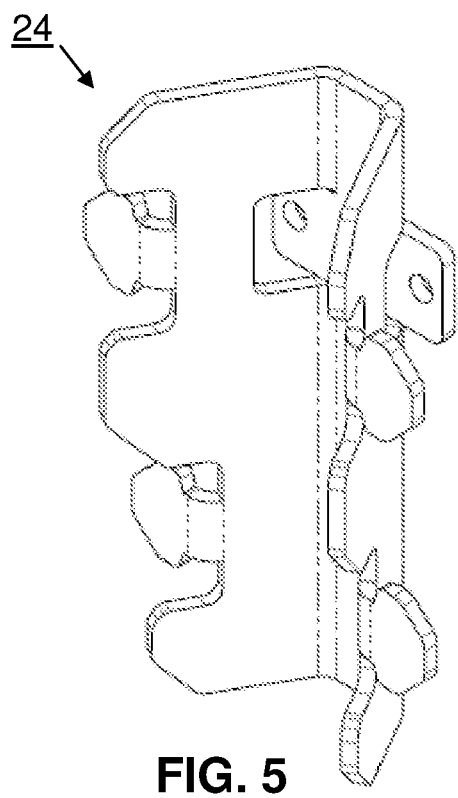
FIG. 5 is a universal tool holder bracket.
Figure 6:
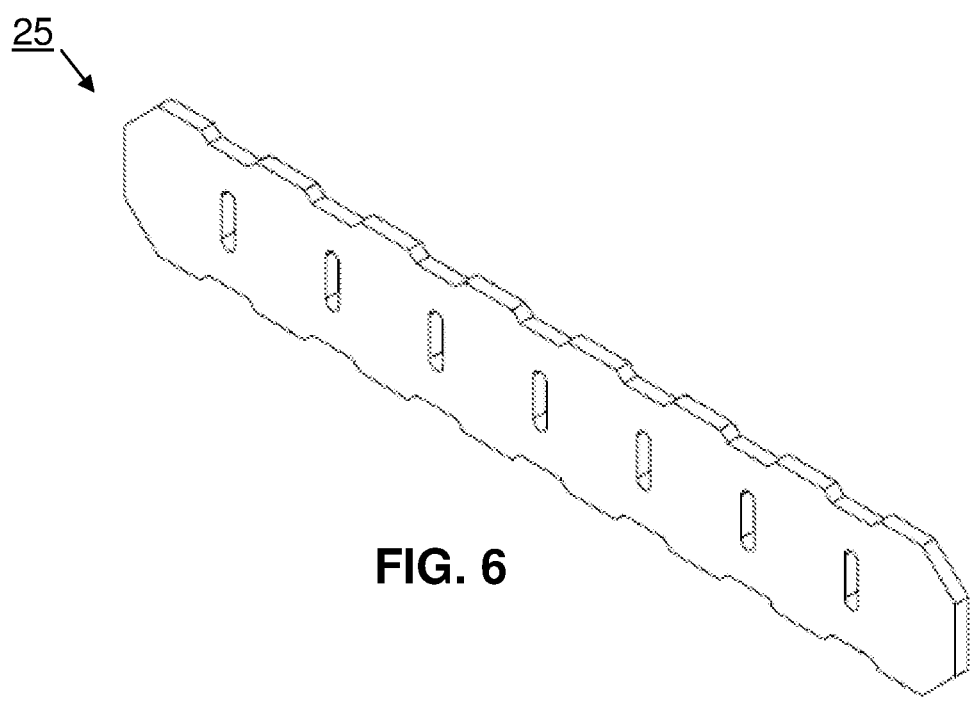
FIG. 6 is a universal tool holder strap.

FIG. 5 depicts universal tool holder bracket 24, which is part of universal tool holder 21. In use, universal tool holder strap 25 of FIG. 6 is engaged with bracket 24, and the length of the strap can be adjusted to cinch in tools for retention and transport.

Figure 8:
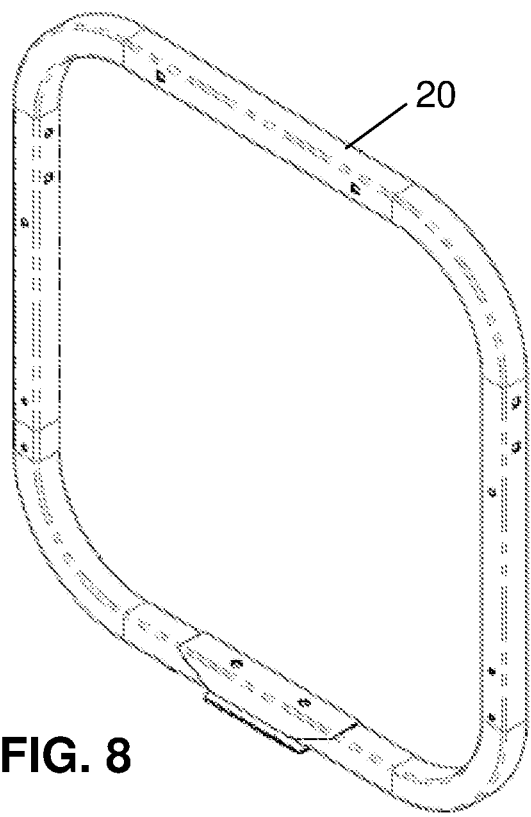
FIG. 8 is a frame.
Figure 9:
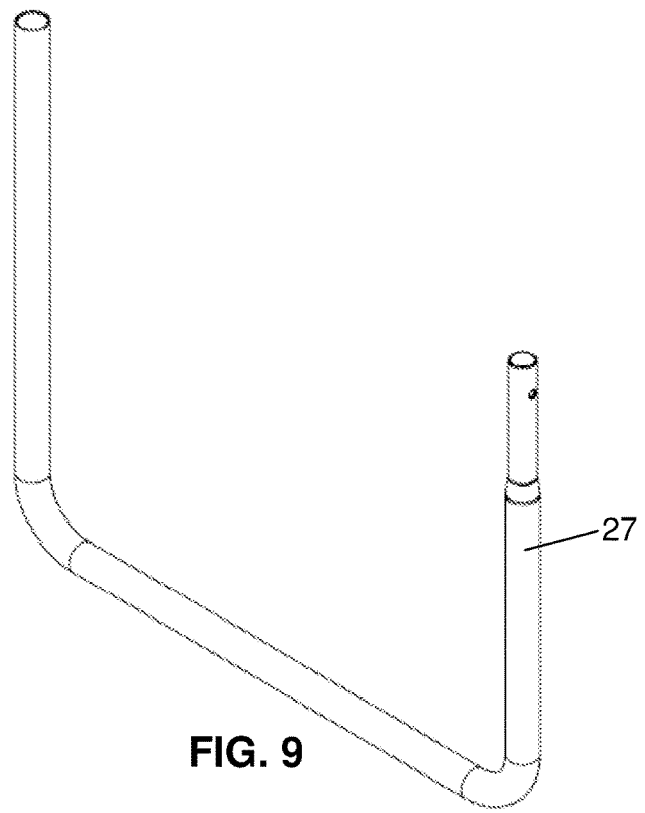
FIG. 9 is three sides of a bag support.

Referring to FIG. 8, frame 20 is preferably constructed of a plurality of segments of squared tubing which are connected for use. Similarly, bag support 27 is preferably constructed of a plurality of segments that are put together for use as shown in FIG. 9. In preferred embodiments the segments of frame 20 and bag support 27 slide together end-to-end and are retained in position with spring pins. Frame and bag support may be assembled and disassembled for extended storage as desired.

In use a user securely attaches hitch assembly mounting plate 42 to rear end of a vehicle, preferably on a solid structure such as the frame, then connects receiver 44 to mounting plate. The vehicle is now configured to receive carrying system 10. Column 56 of carrying system 10 is engaged with receiver 44 of hitch assembly 40, and secured using bolts or the like. To use the carrying system, basket assembly 30 is pivoted downwardly so bottom 34 is substantially perpendicular to frame 20. In this downward position lanyards 26 are substantially taut, and items such as materials and tools can be placed in basket assembly 30. Additionally, items can be attached to or placed in various accessories such as universal tool holder 21, tool attaching accessory 22 and tool trough 70. Vehicle can be driven as normal. When basket assembly 30 is empty, basket support 27 can be pivoted upwardly and releasably secured to frame 20 using storage strap 38. In this orientation basket support 27 is substantially parallel to frame 20 for storage. For longer term storage frame 20 and/or basket support 27 can be disassembled by disconnecting segments end-from-end.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Ranges of values set forth inherently include endpoints, as well as all increments between. Also, it should be understood that all values are "approximately", and "approximately" and the like, unless otherwise stated or contrary to common sense, are +/−10%.

What is claimed is:
1. A carrying system including:
 a. A substantially vertical frame;
 b. A planar basket support defining a perimeter with four sides, said basket support pivotably connected to said vertical frame along one of said four sides such that an axis is formed between said vertical frame and said basket support;
 c. A flexible basket assembly connected to said basket support; and
 d. A column connected to and downwardly projecting from said vertical frame, said column configured to releasably engage a hitch assembly, wherein said basket support is substantially parallel to said vertical frame when pivoted upwardly.

2. The carrying system of claim 1 wherein said vertical frame includes four sides of approximately equal length.

3. The carrying system of claim 2 wherein said four sides of said frame are releasably engaged together end-to-end.

4. The carrying system of claim 1 wherein said basket support perimeter is rectangular.

5. The carrying system of claim 4 wherein said four sides of said basket support are releasably engaged together end-to-end.

6. The carrying system of claim 1 wherein said basket assembly includes one front wall, one rear wall, two side walls and a bottom.

7. The carrying system of claim 6 further comprising an insert sized and shaped to fit snugly atop said bottom.

8. The carrying system of claim 1 further comprising at least one lanyard connecting said vertical frame to said basket support, said lanyard substantially taut when said basket support is pivoted downwardly.

9. A transportation system including:
a. A vehicle;
b. A hitch assembly connected to said vehicle;
c. A column releasably engaged with said hitch assembly; and
d. A carrying system connected to said column, said carrying system including a substantially vertical frame, a planar basket support defining a perimeter with four sides, said basket support pivotably connected to said vertical frame along one of said four sides such that an axis is formed between said vertical frame and said basket support, and a flexible basket assembly connected to said basket support, wherein said basket support is substantially parallel to said vertical frame when pivoted upwardly, and wherein said column projects downwardly from said vertical frame.

10. The transportation system of claim 9 wherein said vehicle is selected from the group consisting of a tractor, a mower, and an ATV.

11. The transportation system of claim 9 wherein said hitch assembly includes a mounting plate directly attached to said vehicle and a receiver directly attached to said mounting plate.

12. The transportation system of claim 11 wherein said receiver and said column are configured for male-to-female engagement.

13. The transportation system of claim 9 further comprising at least one accessory attached to said frame, said accessory selected from the group consisting of a universal tool holder, a tool attaching accessory and a tool trough.

14. A method of transporting items including the non-sequential acts of:

a. Attaching a hitch assembly mounting plate to the rear of a vehicle;
b. Attaching a receiver to said hitch assembly mounting plate;
c. Attaching the column of a carrying system to said receiver;
d. Pivoting a planar basket support of said carrying system downwardly until at least one lanyard connected to said basket support is taut, said basket support defining a perimeter with four sides and pivotably connected to a vertical frame along one of said four sides such that an axis is formed between said vertical frame and said basket support;
e. Positioning items within a basket assembly of said carrying system;
f. Driving vehicle;
g. Removing items from said basket assembly;
h. Pivoting said basket support upwardly; and
i. Securing said basket support in upward position, wherein said basket support is substantially parallel to said vertical frame when pivoted upwardly, and wherein said column projects downwardly from said vertical frame.

15. The method of claim 14 further including the act of connecting said four sides of said basket support end-to-end.

16. The method of claim 15 further including the act of disconnecting said basket support end-to-end.

17. The method of claim 15 further including the act of disconnecting said vertical frame end-to-end.

18. The method of claim 14 further including the act of attaching a tool to an accessory, said accessory selected from the group consisting of a universal tool holder, a tool attaching accessory and a tool trough.

* * * * *